United States Patent
Somashankarappa

(10) Patent No.: US 10,067,412 B2
(45) Date of Patent: Sep. 4, 2018

(54) INTERCHANGABLE DISC USED FOR AIRCRAFT PROJECTOR SYSTEMS

(71) Applicant: Goodrich Lighting Systems, Inc., Oldsmar, FL (US)

(72) Inventor: Vinay Somashankarappa, Bangalore (IN)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 0 days.

(21) Appl. No.: 15/169,779

(22) Filed: Jun. 1, 2016

(65) Prior Publication Data

US 2017/0192345 A1 Jul. 6, 2017

(30) Foreign Application Priority Data

Dec. 30, 2015 (IN) .......................... 4328/DEL/2015

(51) Int. Cl.
| | |
|---|---|
| *G03B 21/64* | (2006.01) |
| *G03B 21/00* | (2006.01) |
| *G03B 21/20* | (2006.01) |
| *G03B 23/10* | (2006.01) |
| *G03B 21/10* | (2006.01) |
| *B64D 45/00* | (2006.01) |

(52) U.S. Cl.
CPC ....... *G03B 21/001* (2013.01); *G03B 21/2033* (2013.01); *G03B 21/64* (2013.01); *G03B 23/105* (2013.01); *B64D 2045/007* (2013.01); *G03B 21/10* (2013.01)

(58) Field of Classification Search
CPC ........ G03B 21/10; G03B 21/56; G03B 21/64; G03B 21/2033; G03B 29/00; G11B 17/22; G11B 17/056; G11B 17/057; G11B 17/0565; G11B 33/08; G11B 33/025

See application file for complete search history.

(56) References Cited

U.S. PATENT DOCUMENTS

| | | | |
|---|---|---|---|
| 3,771,255 A | 11/1973 | Carabet et al. | |
| 4,029,408 A | 6/1977 | Overby | |
| 9,158,189 B2 * | 10/2015 | Joseph | ................ G03B 21/604 |
| 2005/0083486 A1 * | 4/2005 | Johnson | ................ G03B 29/00 353/15 |
| 2010/0201949 A1 * | 8/2010 | Barnett | ................ G03B 25/00 352/101 |

(Continued)

FOREIGN PATENT DOCUMENTS

| | | |
|---|---|---|
| CH | 239568 A | 10/1945 |
| WO | 2006002852 A2 | 1/2006 |

OTHER PUBLICATIONS

Extended European Search Report for EP Application No. 16206287.1-1568, dated Jun. 2, 2017, pp. 1-7.

*Primary Examiner* — Sultran Chowdhury
(74) *Attorney, Agent, or Firm* — Cantor Colburn LLP

(57) ABSTRACT

A device for projecting an image on a projector module screen, comprising an interchangeable disc including at least one image disposed thereon and a light source for illuminating the at least one image. The device further includes a lens for receiving the at least one image from the interchangeable disc and passing the image to the projector module screen, wherein the projector module screen displays the image and a projector module housing enclosing the interchangeable disc, the light source, and the lens.

18 Claims, 2 Drawing Sheets

(56) References Cited

U.S. PATENT DOCUMENTS

2010/0296066 A1* 11/2010 Ou Yang ................ F21V 14/06
353/119
2010/0302467 A1* 12/2010 Nagaharu .............. G03B 21/14
348/759

* cited by examiner

INTERCHANGABLE DISC USED FOR AIRCRAFT PROJECTOR SYSTEMS

CROSS-REFERENCE TO RELATED APPLICATIONS AND PRIORITY CLAIM

This application claims priority to Indian Patent Application No. 4328/DEL/2015, filed on Dec. 30, 2015, and all the benefits accruing therefrom under 35 U.S.C. § 119, the contents of which in its entirety are herein incorporated by reference.

BACKGROUND

The present disclosure relates generally to image projection systems, and more 13 specifically, to projector type indicator signs.

Passengers on aircrafts are able to view illuminated signs throughout the cabin. These warning and indicator signs include seat belt signs, attendant signs, and non-smoking signs. As the needs of the airlines change more indicators will become useful. In today's environment these signs are fixed and require a dedicated space for each indicator where each indicator has a dedicated light bulb consuming both space and electric power. As these light bulbs are used over time they will begin to fail requiring replacement. As the number of signs increase, the number of light bulbs, required space, and maintenance will increase.

BRIEF DESCRIPTION

In accordance with an embodiment of the invention, a device for projecting an image on a projector module screen, includes an interchangeable disc including at least one image disposed thereon and a light source for illuminating the at least one image. The device further includes a lens for receiving the at least one image from the interchangeable disc and passing the image to the projector module screen, wherein the projector module screen displays the image and a projector module housing enclosing the interchangeable disc, the light source, and the lens.

In accordance with an embodiment of the invention, a system for projecting an image on a projector module screen, includes an interchangeable disc including at least one or more images disposed thereon and a light source for illuminating the at least one image. The system further includes a lens for receiving the at least one image from the interchangeable disc and passing the image to the projector module screen, wherein the projector module screen displays the image and a projector module housing enclosing the interchangeable disc, the light source, and the lens.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

In accordance with embodiments of the disclosure, device and system for projector type indicator signs are provided.

Figure 1:
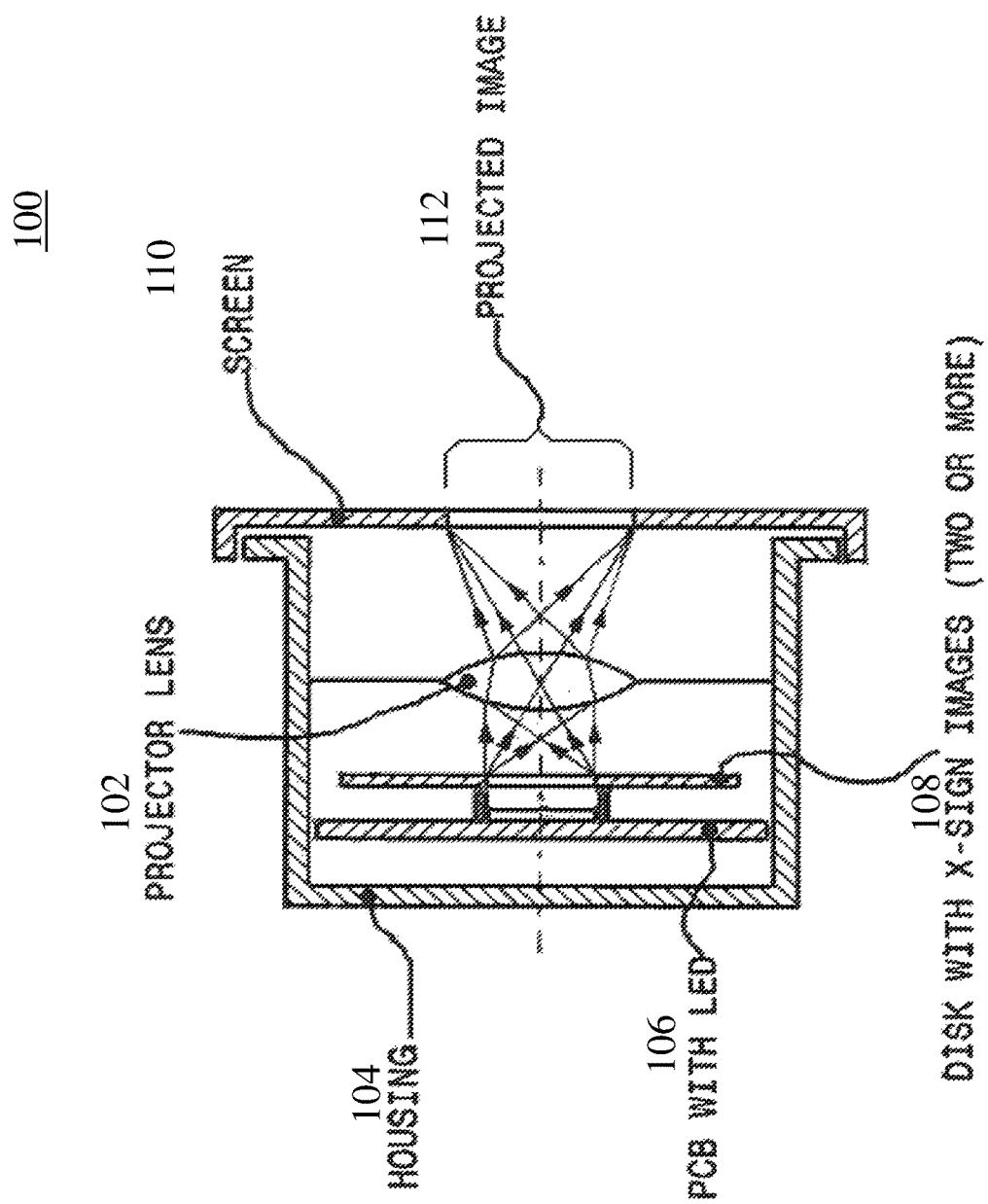
FIG. 1 is a block diagram of the projector system, in accordance with some embodiments.

Referring to FIG. 1, a projector system 100 for a projector type indicator sign is shown. In one embodiment, projector system 100 may be coupled to or controlled by the computer system. Projector system 100 is configured to project images where the system comprises a plurality of components. In an embodiment the projector system 100 is capable of projecting signs, logos, symbols, marks, and the like. Printed circuit board (PCB) 106 includes a light source 107. In one embodiment, the light source is a light emitting diode LED 107 and it provides light to illuminate portions of interchangeable disc 108. Disc 108 has various images that are used to provide different indicators. As the light passes through disc 108, the projected image is provided to projector lens 102. Projector lens 102 is responsible for focusing the projected image 112 and further providing the image to the projector screen 110. The above components are located within housing 104 of the projector system.

In one embodiment projector system 100 is used in a commercial airline environment. The system projects appropriate signals to passengers to indicate certain passenger instructions such as when mobile electronic devices should be powered off, when to fasten their seatbelts, when to return to seat, etc. These images are provided by disc 108, where a single disc can provide a plurality of different images. Other signs or images may be used based on the needs of the customer.

Projector Screen 110 is used for displaying the image. In an embodiment of the invention the projector screen can be a scratch resistant type screen increasing the reliability and durability of the device. In addition, the scratch resistant screen will ensure the audience is provided with a clear image.

The light source of the PCB 106 is used to illuminate the image of the projector system. In projector system 100, the light source 107 can be a light emitting diode (LED). When LEDs are used, several benefits are realized. LEDs provide energy efficiencies, durable quality, and design flexibilities (shape and dynamic control of light color and distribution). The color of the disc images can be designed or different color LEDs may be used to indicate different signals. The LEDs can be of any type not limited to AMOLED or OLED type LEDs. As the reliability of the projector system increases the maintenance costs associated with each device will be reduced. Increased maintenance cost savings are realized as the number of projector system units increase. In the event maintenance is required, either the individual components can be interchanged or the projector systems can be efficiently interchanged.

In some embodiments disc 108 includes a plurality of images which can rotate or display a plurality of images concurrently. In another embodiment disc 108 can be rotated manually or by using a mechanism depending on a customer's requirement. Embodiments include rotating the disc at intervals to show a plurality of images in sequence. For example, if seat belts should be worn, Wi-Fi is available, and the lavatories are occupied, the projector system is capable of cycling through each image in sequence at a configurable interval. The ability to rotate through a plurality of images saves space and increases the functionality of the system, in contrast to providing a single static indicator. Disc 108 can be designed and efficiently interchanged to meet a customer's needs.

In an embodiment a lens is used to focus the image projected on the screen. The lens may be any type of lens. In some embodiments projector lens 102 may be a concave or convex type lens. The projector lens can be interchanged and must be adapted for the purpose of the system.

Housing 104 is provided to protect the internal components of the projector system. Additionally, housing 104 is designed to allow for efficient interchangeability of those internal components to increase the reliability of the projector system and decrease the maintenance cost and time.

Figure 2:
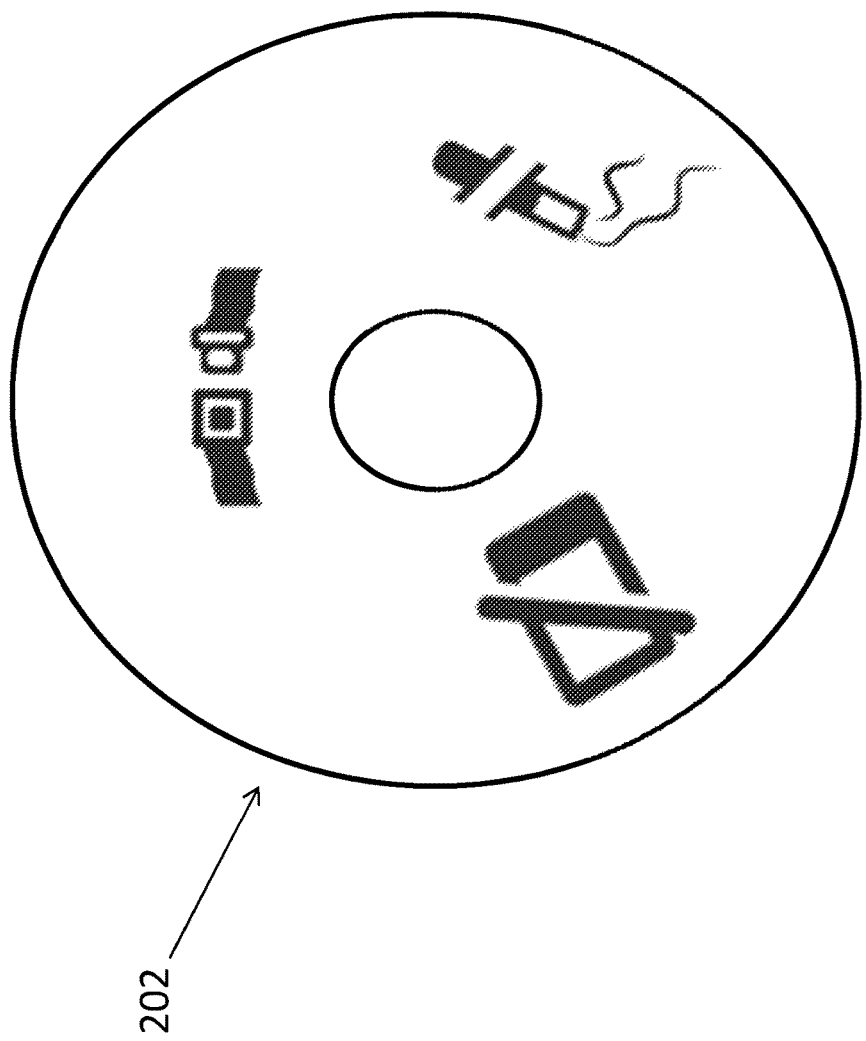
FIG. 2 is an illustration of the interchangeable disc in accordance with some embodiments described herein.

FIG. 2 provides an embodiment of interchangeable disc 202 used in accordance with the invention. Disc 202 includes three images to indicate when to fasten seatbelts, when smoking is prohibited, and when the use of portable devices is prohibited. Although these particular images are shown in this example any number and type of images may be used on the disc as space allows. The discs may be interchangeable with other discs as the needs of the airline change. For example, flights that offer Wi-Fi or other amenities may include or interchange the discs based on the amenities offered on a particular flight or in another example, flights destined to various foreign destinations may choose to interchange discs based on the language of the destination.

Some embodiments include uses and applications in cabin management systems, cabinetry/veneers/peripherals, cargo systems, energetic compositions, energetic devices, fire suppression, inflatable systems, optical, enabling, electronics, and adaptive optics. Non-limiting examples. In addition, other embodiments may include uses ranging from public transportation vehicles (busses, airplanes, trains, etc.) to being utilized in buildings. The projector system can be used in locations that require a sign that is adaptable, reliable, and cost effective.

In an embodiment the projector system can communicate and can be controlled by wired/wireless signals from the computer system. Other embodiments include controlling the projector system to selectively show an array of images/signs concurrently or a single image at a time. In some embodiments the projector system is controlled to rotate the disc at various intervals to show different images/signs in order to conserve space on the aircraft display. A mechanism for rotating the disc is within the scope of an embodiment. Also the discs including the plurality of images/signs may be interchanged as different features and amenities become available on the aircraft.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A device for projecting an image on a projector module screen, comprising:
    an interchangeable disc including at least one image disposed thereon;
    a light source for illuminating the at least one image by passing light through the interchangeable disc,
    a lens for receiving the at least one image from the interchangeable disc and passing the image to the projector module screen, wherein the projector module screen displays the image, wherein the lens is an interchangeable projector lens; and
    a projector module housing enclosing the interchangeable disc, the light source, and the interchangeable projector lens, wherein the interchangeable disc includes at least a seatbelt indicator, Wi-Fi indicator, lavatory indicator, and a non-smoking indicator.

2. The device of claim 1, wherein the light source is a light emitting diode.

3. The device of claim 2, wherein the interchangeable disc includes a plurality of images.

4. The device of claim 3, wherein the interchangeable disc is configured to rotate using a mechanism.

5. The device of claim 4, wherein the interchangeable disc is configured to rotate at fixed intervals to display a different image on the projector module screen.

6. The device of claim 1, wherein the device is controlled to selectively display at least one of a plurality of images.

7. The device of claim 1, wherein the device is controlled to simultaneously display a plurality of images.

8. The device of claim 1, wherein the interchangeable disc is a manually rotated interchangeable disc.

9. The device of claim 1, wherein the device is an interchangeable projector device.

10. A system for projecting an image on a projector module screen, comprising:
    an interchangeable disc, wherein the interchangeable disc includes at least one image;
    a light source for illuminating the at least one image on the interchangeable disc by passing light through the interchangeable disc;
    a lens for receiving the at least one image from the interchangeable disc and passing the image to the projector module screen, wherein the projector module screen displays the image; and
    a projector module housing enclosing the interchangeable disc, the light source, and the interchangeable projector lens, wherein the interchangeable disc includes at least a seatbelt indicator, Wi-Fi indicator, lavatory indicator, and a non-smoking indicator.

11. The system of claim 10, wherein the light source is a light emitting diode.

12. The system of claim 11, wherein the interchangeable disc includes a plurality of images.

13. The system of claim 12, wherein the interchangeable disc is configured to rotate using a mechanism.

14. The system of claim 13, wherein the interchangeable disc is configured to rotate at fixed intervals to display a different image on the projector module screen.

15. The system of claim 10, wherein the device is controlled to selectively display at least one of a plurality of images.

16. The system of claim 10, wherein the device is controlled to simultaneously display a plurality of images.

17. The system of claim 10, wherein the system is controlled by a computer system of an aircraft.

18. The system of claim 10, wherein the system is an interchangeable projector system.

\* \* \* \* \*